(12) United States Patent
Yang

(10) Patent No.: US 8,776,973 B2
(45) Date of Patent: Jul. 15, 2014

(54) COMPELLING-TYPE RADIAL CLUTCH DEVICE WITH C-SHAPED JOINT STRUCTURE

(76) Inventor: Tai-Her Yang, Dzan-Hwa (TW)

(*) Notice: Subject to any disclaimer, the term of this patent is extended or adjusted under 35 U.S.C. 154(b) by 485 days.

(21) Appl. No.: 13/004,914

(22) Filed: Jan. 12, 2011

(65) Prior Publication Data
US 2012/0175211 A1 Jul. 12, 2012

(51) Int. Cl.
*F16D 43/208* (2006.01)
*F16D 41/06* (2006.01)

(52) U.S. Cl.
USPC ......... 192/38; 192/44; 192/45.001; 192/45.1; 192/54.1; 192/75

(58) Field of Classification Search
USPC ................. 192/38, 41 R, 45.001, 45.004, 74
See application file for complete search history.

(56) References Cited

U.S. PATENT DOCUMENTS

| | | | | |
|---|---|---|---|---|
| 483,533 A | * | 10/1892 | Canedy | 192/41 R |
| 3,486,597 A | * | 12/1969 | Carlton | 192/46 |
| 2012/0181131 A1 | * | 7/2012 | Yang | 192/31 |

* cited by examiner

*Primary Examiner* — Richard M. Lorence
(74) *Attorney, Agent, or Firm* — Bacon & Thomas, PLLC

(57) ABSTRACT

A compelling-type radial clutch device includes a V-shaped bendable joint structure installed between an active rotary part and a passive rotary part and driven by the active rotary part The V-shaped joint structure includes a joint axial core connecting an active arm of V-shaped joint structure and a compelling arm of the V-shaped joint structure, and an outward-expanding spring installed between the two arms, so that a prestressed outward-expanding bias force between the two arms causes angular displacement of the compelling arm by causing the angle between the two arms to increase, one end of the active arm of the V-shaped joint structure being connected and fastened on the active rotary part; and the other end of the compelling arm of the V-shaped joint structure being installed with a compression head or roller arranged to engage an inner notch in the passive rotary part.

10 Claims, 7 Drawing Sheets

COMPELLING-TYPE RADIAL CLUTCH DEVICE WITH C-SHAPED JOINT STRUCTURE

BACKGROUND OF THE INVENTION (a) Field of the Invention

The present invention relates to a compelling-type radial clutch device with V-shaped joint structure, in which a V-shaped joint structure assembly, which can be bent for displacement, is installed between an active rotary part and a passive rotary part of the radial clutch device with a radial arrangement means and is driven by the active rotary part, a joint axial core of V-shaped joint structure is provided for connecting an active arm of V-shaped joint structure and a compelling arm of V-shaped joint structure, an outward-expanding spring is installed between the two arms, so that a prestressed outward-expanding force is formed between the two arms for performing the angular displacement by causing the angle between the arms to increase, the other end of the active arm of V-shaped joint structure is connected and fastened on the active rotary part; and the other end of the compelling arm of V-shaped joint structure is installed with a compelling roller which is outwardly expanded through the biasing force and compelled to be engaged in an inner notch in the passive rotary part; wherein when the rotational kinetic energy source at the active rotary part performs the rotation driving of the active rotary part in a direction opposite to the direction in which the V-shaped joint structure is biased to bend, the V-shaped joint structure is compelled to move through the active arm of the V-shaped joint structure, so that the compelling roller installed on the compelling arm of V-shaped joint structure is compelled to be engaged with a compelling end surface of an passive side inner notch so as to drive the passive rotary part; and characterized in that when the active rotary part does not apply the torque to the active arm of V-shaped joint structure in a direction opposite to the direction in which the V-shaped joint structure is biased to bend, and the passive rotary part drives in a direction the same or opposite to the direction in which the V-shaped joint structure is biased to bend, the compelling roller installed on the compelling arm of V-shaped joint structure is compelled to retract through an extended inclined surface of the passive side inner notch, so an idle sliding rotation state is formed between the passive rotary part and the active rotary part.

(b) Description of the Prior Art

A conventional single-way clutch or over-running clutch often has the four following transmission features:

1. When the rotation speed of normal rotation of the active side is higher than that of the passive side, the active side drives the passive side;
2. When the rotation speed of normal rotation of the passive side is higher than that of the active side, the passive side is in an idle sliding rotation state relative to the active side and is not linked with the active side (the friction linkage force of a sliding mechanism is an exception);
3. When the active side reversely rotates, the passive side is in an idle sliding rotation state and is not linked with the active side (the friction linkage force of a sliding mechanism is an exception);
4. When the rotation speed of reverse rotation of the passive side is higher than that of the active side, the passive side drives the active side.

The mentioned four features limit the applied scope of single-way clutch or over-running clutch.

SUMMARY OF THE INVENTION

The present invention relates to a compelling-type radial clutch device with V-shaped joint structure, in which a V-shaped joint structure assembly, which can be bent for displacement, is installed between an active rotary part and a passive rotary part of the radial clutch device with a radial arrangement means and is driven by the active rotary part, a joint axial core of V-shaped joint structure is provided for connecting an active arm of V-shaped joint structure and a compelling arm of V-shaped joint structure, an outward-expanding spring is installed between the two arms, so that a prestressed outward-expanding force is formed between the two arms for performing the angular displacement by causing the angle between the arms to increase, the other end of the active arm of V-shaped joint structure is connected and fastened on the active rotary part; and the other end of the compelling arm of V-shaped joint structure is installed with a compelling roller which is outwardly expanded through the biasing force and compelled to be engaged in an inner notch in the passive rotary part, and has the following functions:

1. When the active rotary part performs the rotation driving in a direction opposite to the direction in which the V-shaped joint structure is biased to bend, and the rotation speed of normal rotation of the active rotary part is higher than that of the passive rotary part, the active rotary part drives the passive rotary part;
2. When the passive rotary part performs the rotation driving in a direction opposite to the direction in which the V-shaped joint structure is biased to bend, and the rotation speed thereof is higher than that of the active rotary part, the passive rotary part is in an idle sliding rotation state relative to the active rotary part and is not linked with the active rotary part (the friction linkage force of a sliding mechanism is an exception);
3. When the active rotary part performs the rotation driving in a direction the same as the direction in which the V-shaped joint structure is biased to bend, the passive rotary part is in an idle sliding rotation state and is not linked with the active rotary part (the friction linkage force of a sliding mechanism is an exception);
4. When the passive rotary part performs the rotation driving in a direction the same as the direction in which the V-shaped joint structure is biased to bend, and the rotation speed thereof is higher than that of the active rotary part and the active rotary part (101) does not input the rotational kinetic energy, the passive rotary part is in an idle sliding rotation state and not being linked with the active rotary part (the friction linkage force of a sliding mechanism is an exception).

DESCRIPTION OF MAIN COMPONENT SYMBOLS

Figure 1:
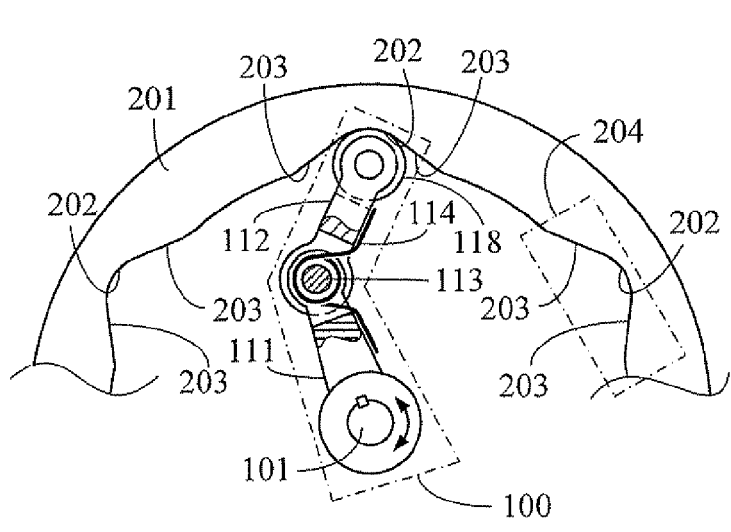
FIG. 1 is a schematic view showing the fundamental theory structure according to the present invention.

100: V-shaped joint structure assembly
101: Active rotary part
111: Active arm of V-shaped joint structure
112: Compelling arm of V-shaped joint structure
113: Joint axial core of V-shaped joint structure
114: Outward-expanding recovery spring
115: Tension recovery spring
117: Compelling head
118: Compelling roller
122: Extend rod of compelling arm of V-shaped joint structure
201: Passive rotary part
202: Compelling end surface of passive side inner tooth shaped slot
203: Extended inclined surface of passive side inner tooth shaped slot
204: Inner tooth shaped slot
1000: Active side machine body

DETAILED DESCRIPTION OF THE PREFERRED EMBODIMENTS

A conventional single-way clutch or over-running clutch often has the four following transmission features:

1. When the rotation speed of normal rotation of the active side is higher than that of the passive side, the active side drives the passive side;
2. When the rotation speed of normal rotation of the passive side is higher than that of the active side, the passive side is in an idle sliding rotation state relative to the active side and is not linked with the active side (the friction linkage force of a sliding mechanism is an exception);
3. When the active side reversely rotates, the passive side is in an idle sliding rotation state and is not linked with the active side (the friction linkage force of a sliding mechanism is an exception);
4. When the rotation speed of reverse rotation of the passive side is higher than that of the active side, the passive side drives the active side.

The mentioned four features limit the applied scope of single-way clutch or over-running clutch limit.

The present invention relates to a compelling-type radial clutch device with V-shaped joint structure, in which a V-shaped joint structure assembly, which can be bended for displacement, is installed between an active rotary part and a passive rotary part of the radial clutch device with a radial arrangement means and is driven by the active rotary part, a joint axial core of V-shaped joint structure is provided for connecting an active arm of V-shaped joint structure and a compelling arm of V-shaped joint structure, an outward-expanding spring is installed between the two arms, so that a prestressed outward-expanding force is formed between the two arms for performing the angular displacement by causing the angle between the arms to increase, the other end of the active arm of V-shaped joint structure is connected and fastened on the active rotary part; and the other end of the compelling arm of V-shaped joint structure is installed with a compelling roller which is outwardly expanded through the biasing force and compelled to be engaged in an inner notch in the passive rotary part; when the rotational kinetic energy source at the active rotary part performs the rotation driving to the active rotary part in a direction opposite to the direction in which the V-shaped joint structure is biased to bend, the V-shaped joint structure is compelled to move through the active arm of V-shaped joint structure, so that the compelling roller installed on the compelling arm of V-shaped joint structure is compelled to be engaged on a compelling end surface of passive side inner notch so as to drive the passive rotary part; and characterized in that when the active rotary part does not apply the torque to the active arm of V-shaped joint structure in a direction opposite to the direction in which the V-shaped joint structure is biased to bend, and the passive rotary part drives in a direction the same or opposite to the direction in which the V-shaped joint structure is biased to bend, the compelling roller installed on the compelling arm of V-shaped joint structure is compelled to retract through an extended inclined surface of passive side inner tooth shaped slot, so an idle sliding rotation state is formed between the passive rotary part and the active rotary part.

The present invention relates to a compelling-type radial clutch device with V-shaped joint structure, in which a V-shaped joint structure assembly, which can be bended for displacement, is installed between an active rotary part and a passive rotary part of the radial clutch device with a radial arrangement means and is driven by the active rotary part, a joint axial core of V-shaped joint structure is provided for connecting an active arm of V-shaped joint structure and a compelling arm of V-shaped joint structure, an outward-expanding spring is installed between the two arms, so that a prestressed outward-expanding force is formed between the two arms for performing the angular displacement by causing the angle between the arms to increase, the other end of the active arm of V-shaped joint structure is connected and fastened on the active rotary part; and the other end of the compelling arm of V-shaped joint structure is installed with a compelling roller which is outwardly expanded through the biasing force and compelled to be engaged in an inner notch in the passive rotary part, and has the following performances which include:
1. When the active rotary part performs the rotation driving in a direction opposite to the direction in which the V-shaped joint structure is biased to bend, and the rotation speed of normal rotation of the active rotary part is higher than that of the passive rotary part, the active rotary part drives the passive rotary part;
2. When the passive rotary part performs the rotation driving in a direction opposite to the direction in which the V-shaped joint structure is biased to bend, and the rotation speed thereof is higher than that of the active rotary part, the passive rotary part is in an idle sliding rotation state relative to the active rotary part and not being linked with the active rotary part (the friction linkage force of a sliding mechanism is an exception);
3. When the active rotary part performs the rotation driving in a direction the same as the direction in which the V-shaped joint structure is biased to bend, the passive rotary part is in an idle sliding rotation state and not being linked with the active rotary part (the friction linkage force of a sliding mechanism is an exception);
4. When the passive rotary part performs the rotation driving in a direction the same as the direction in which the V-shaped joint structure is biased to bend, and the rotation speed thereof is higher than that of the active rotary part and the active rotary part (101) does not input the rotational kinetic energy, the passive rotary part is in an idle sliding rotation state for not being linked with the active rotary part (the friction linkage force of a sliding mechanism is an exception).

FIG. 1 is a schematic view showing the fundamental theory structure according to the present invention.

Figure 2:
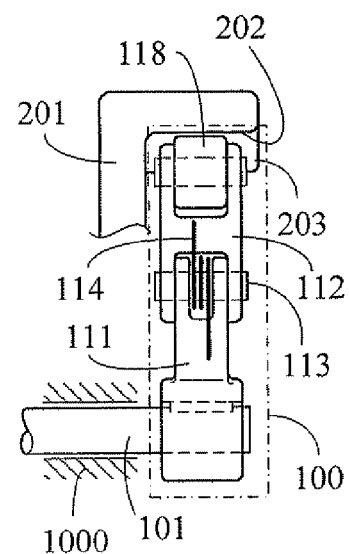
FIG. 2 is a lateral view showing the fundamental theory structure according to the present invention.

FIG. 2 is a lateral view showing the fundamental theory structure according to the present invention.

Figure 3:
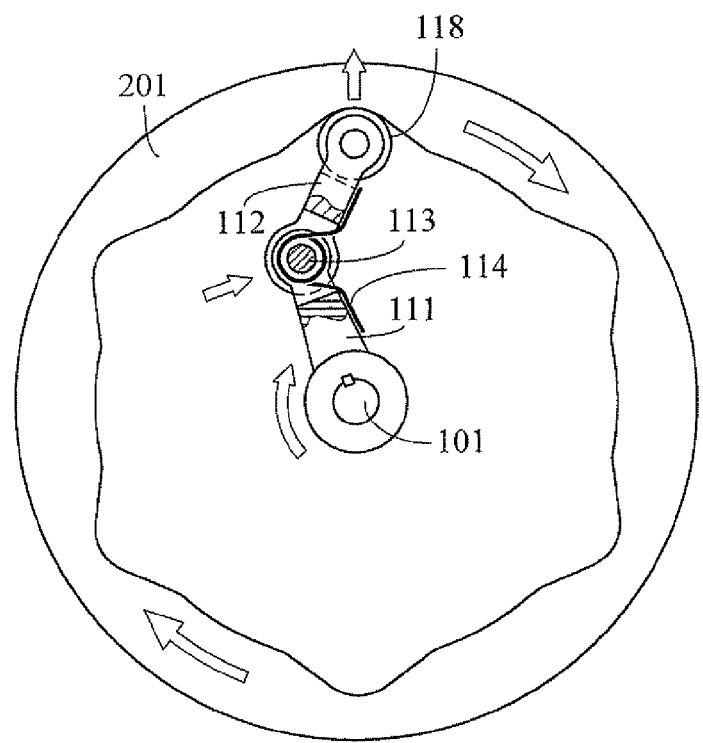
FIG. 3 is a schematic view showing the operation of the active rotary part (101) performing the rotation driving in a direction opposite to the direction in which the V-shaped joint structure assembly (100) is biased to bend so as to drive the passive rotary part (201).

As shown in FIG. 1 and FIG. 2, it mainly consists of:

Active rotary part (101): installed in an active side machine body (1000) and serving to input the active rotational kinetic energy, one end of the active arm of V-shaped joint structure (111) is connected and fastened on the active rotary part (101), the other end of the active arm of V-shaped joint structure (111) is coupled with a compelling arm of V-shaped joint structure (112) through a bendable V-shaped joint structure (100) installed therebetween, and installed with a joint axial core of V-shaped joint structure (113), an outward-expanding recovery spring (114) is installed between the active arm of V-shaped joint structure (111) and the compelling arm of V-shaped joint structure (112), so that a prestressed outward-expanding force is formed between the active arm of V-shaped joint structure (111) and the compelling arm of V-shaped joint structure (112) for performing the angle displacement by causing the angle between the arms to increase;

Passive rotary part (201): which is a rotation structure for outputting the rotational kinetic energy, and installed with a transmission part formed in an annular structure, an inner notch (204) is inwardly formed in the annular structure, for being coupled with a compelling roller (118);

Compelling arm of V-shaped joint structure (112) having the compelling roller (118) at the distal end, and a compelling engagement state is formed between the compelling roller (118) and a compelling end surface of passive side notch (202) of the passive rotary part (201);

The operation functions of the compelling-type radial clutch device with V-shaped joint structure according to the present invention are as followings:

FIG. 3 is a schematic view showing the operation of the active rotary part (101) performing the rotation driving in a direction opposite to the direction in which the V-shaped joint structure assembly (100) is biased to bend so as to drive the passive rotary part (201).

As shown in FIG. 3, in the compelling-type radial clutch device with V-shaped joint structure as shown in FIG. 1, when the active rotary part (101) performs the driving in a direction (the clockwise direction) opposite to the direction in which the V-shaped joint structure assembly (100) is biased to bend, and the rotation torque thereof compels the compelling arm of V-shaped joint structure (112) through the bendable V-shaped joint structure (100), the compelling roller (118) at the distal end of the compelling arm of V-shaped joint structure (112) generates a clockwise compelling force to the compelling end surface of passive side notch (202) of the passive rotary part (201); and the bending angle of the bendable V-shaped joint structure (100) is in a state to ensure, while the mentioned clockwise compelling force being generated, the outward-expanding force generated by the compelling arm of V-shaped joint structure (112) to the compelling roller (118) at the distal end thereof is larger than the inward pressing force from an extended inclined surface of passive side notch (203) to the compelling roller (118), thereby the active rotary part (101) drives the passive rotary part (201) to clockwise rotate.

Figure 4:
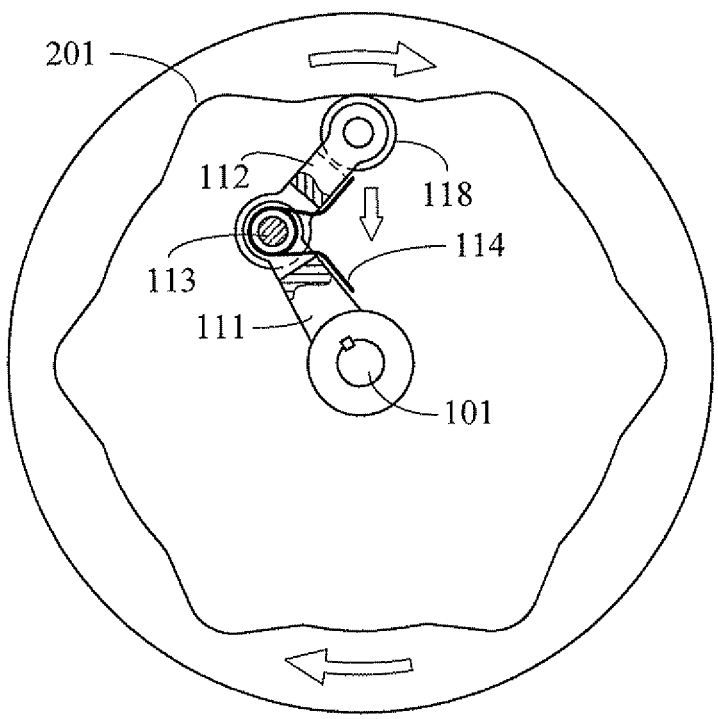
FIG. 4 is a schematic view showing the operation of the passive rotary part (201) performing over running to the active rotary part (101) in the direction (the clockwise direction) opposite to the direction in which the V-shaped joint structure assembly (100) is biased to bend, so as to form an idle sliding rotation relative to the active rotary part, according to the present invention.

According to the present invention, the compelling-type radial clutch device with V-shaped joint structure further includes the passive rotary part (201) performs over running to the active rotary part (101) in the direction opposite to the direction in which the V-shaped joint structure is biased to bend, so that an idle rotation state is formed between the active rotary part (101) and the passive rotary part (201);

FIG. 4 is a schematic view showing the operation of the passive rotary part (201) performing over running to the active rotary part (101) in the direction (the clockwise direction) opposite to the direction in which the V-shaped joint structure assembly (100) is biased to bend, so as to form an idle sliding rotation relative to the active rotary part, according to the present invention.

As shown in FIG. 4, in the compelling-type radial clutch device with V-shaped joint structure shown in FIG. 1, when the passive rotary part (201) performs the clockwise over running to the active rotary part (101) in the direction opposite to the direction in which the V-shaped joint structure assembly (100) is biased to bend, the compelling roller (118) at the distal end of the compelling arm of V-shaped joint structure (112) is compelled through the extended inclined surface of passive side notch (203) of the passive rotary part (201), so the compelling arm of V-shaped joint structure (112) is inwardly bended and an idle rotation state is formed between the active rotary part (101) and the passive rotary part (201), when the compelling force of the extended inclined surface of passive side notch (203) is no longer provided, the compelling arm of V-shaped joint structure (112) is outwardly expanded so as to be recovered through the biasing force of the outward-expanding recovery spring (114).

Figure 5:
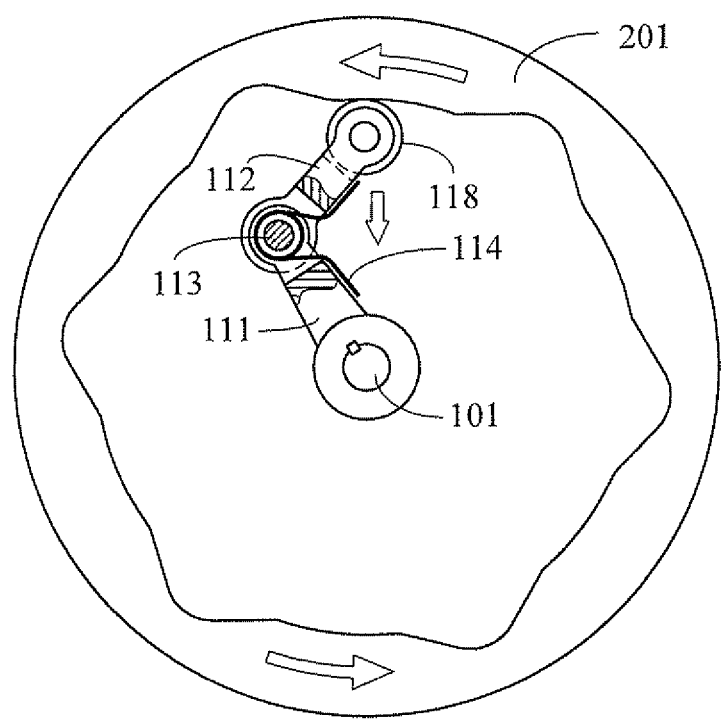
FIG. 5 is a schematic view showing the operation of the passive rotary part (201) performing the rotation driving in the direction (the counterclockwise direction) the same as the direction in which the V-shaped joint structure assembly (100) is biased to bend, and the active rotary part (101) does not input the rotational kinetic energy, so as to form an idle sliding rotation relative to the active rotary part, according to the present invention.

According to the present invention, the compelling-type radial clutch device with V-shaped joint structure further includes the passive rotary part (201) drives the active rotary part (101) in the direction the same as the direction in which the V-shaped joint structure is biased to bend, and when the active rotary part (101) does not input the rotational kinetic energy, an idle rotation state is formed between the active rotary part (101) and the passive rotary part (201);

FIG. 5 is a schematic view showing the operation of the passive rotary part (201) performing the rotation driving in the direction (the counterclockwise direction) the same as the direction in which the V-shaped joint structure assembly (100) is biased to bend, and the active rotary part (101) does not input the rotational kinetic energy, so as to form an idle sliding rotation relative to the active rotary part, according to the present invention.

As shown in FIG. 5, in the compelling-type radial clutch device with V-shaped joint structure shown in FIG. 1, when the passive rotary part (201) performs the rotation driving in a direction (the counterclockwise direction) the same as the direction in which the V-shaped joint structure assembly (100) is biased to bend, and the active rotary part (101) does not input the rotational kinetic energy, the compelling arm of V-shaped joint structure (112) and the compelling roller (118) at the distal end of the compelling arm of V-shaped joint structure (112) are inwardly bended through the compelling force of the extended inclined surface of passive side notch (203) of the passive rotary part (201), such that an idle rotation state is formed between the active rotary part (101) and the passive rotary part (201), and when the compelling force of the extended inclined surface of passive side notch (203) is no longer provided, the compelling arm of V-shaped joint structure (112) is outwardly expanded so as to be recovered through the biasing force of the outward-expanding recovery spring (114).

Figure 6:
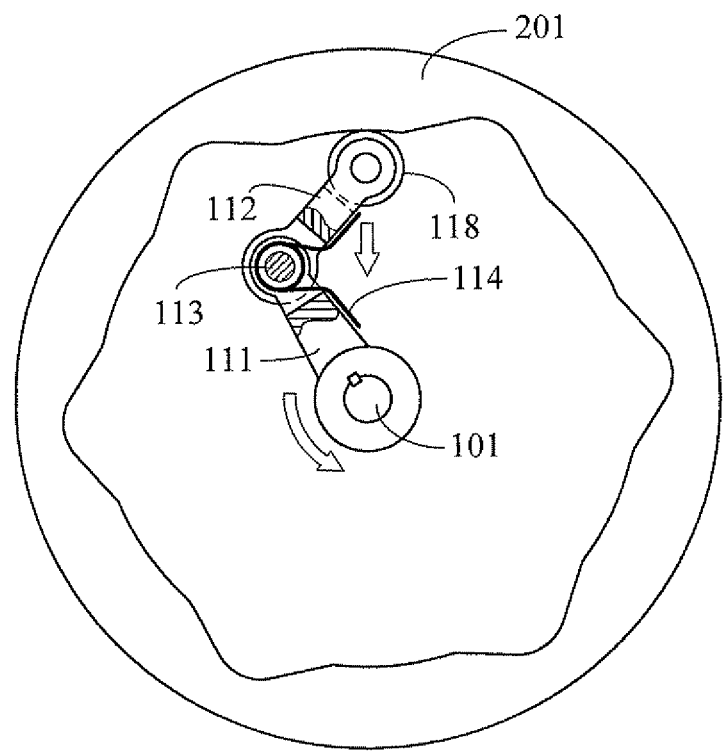
FIG. 6 is a schematic view showing the operation of the active rotary part (101) performing the rotation driving in the direction (the counterclockwise direction) the same as the direction in which the V-shaped joint structure assembly (100) is biased to bend, so as to form an idle sliding rotation state relative to the passive rotary part (201), according to the present invention.

According to the present invention of the compelling-type radial clutch device with V-shaped joint structure, when the active rotary part (101) drives the passive rotary part (201) in the direction (the counterclockwise direction) the same as the direction in which the V-shaped joint structure is biased to bend, and the active rotary part (101) is in an idle rotation state relative to the passive rotary part (201);

FIG. 6 is a schematic view showing the operation of the active rotary part (101) performing the rotation driving in the direction (the counterclockwise direction) the same as the direction in which the V-shaped joint structure assembly (100) is biased to bend, so as to form an idle sliding rotation state relative to the passive rotary part (201), according to the present invention.

As shown in FIG. 6, when the active rotary part (101) performs the counterclockwise driving to the passive rotary part (201) in the direction the same as the direction in which the V-shaped joint structure assembly (100) is biased to bend, the compelling arm of V-shaped joint structure (112) and the compelling roller (118) at the distal end of the compelling arm of V-shaped joint structure (112) are compelled by the extended inclined surface of passive side notch (203) of the passive rotary part (201), and the compelling arm of V-shaped joint structure (112) is inwardly bended, so an idle rotation state is formed between the active rotary part (101) and the passive rotary part (201), and when the compelling force of the extended inclined surface of passive side notch (203) is no longer provided, the compelling arm of V-shaped joint structure (112) is outwardly expanded so as to be recovered through the biasing force of the outward-expanding recovery spring (114).

According to the present invention of the compelling-type radial clutch device with V-shaped joint structure, for enhancing the transmission stability and increasing the transmission torque in practical applications, two or more than two of V-shaped joint structure assemblies (100) having the same joint bending and protruding direction can be installed between the active rotary part (101) and the passive rotary part (201), so as to synchronously interact with the passive rotary part (201).

Figure 7:
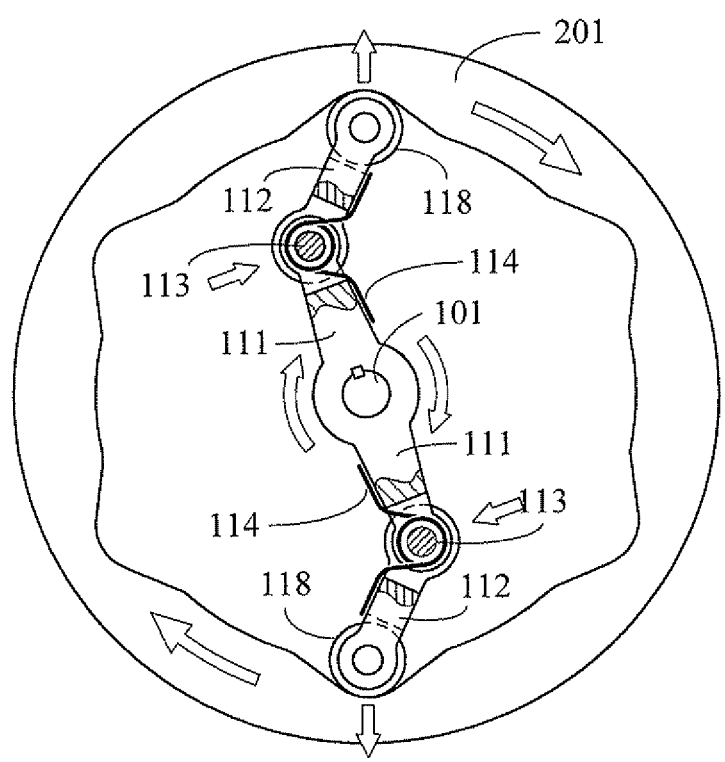
FIG. 7 is a schematic structural view showing a compelling-type radial clutch device with V-shaped joint structure in which two V-shaped joint structure assemblies (100) having the same bending and protruding direction relative to the passive rotary part (201) are installed between the active rotary part (101) and the passive rotary part (201), according to one embodiment of the present invention.

FIG. 7 is a schematic structural view showing the compelling-type radial clutch device with V-shaped joint structure in which two V-shaped joint structure assemblies (100) having the same bending and protruding direction relative to the passive rotary part (201) being installed between the active rotary part (101) and the passive rotary part (201), according to one embodiment of the present invention.

As shown in FIG. 7, a first V-shaped joint structure assembly (100) and a second V-shaped joint structure assembly (100) are installed between the active rotary part (101) and the passive rotary part (201) in a radial arrangement, the joint structures of the first V-shaped joint structure assembly (100) and the second V-shaped joint structure assembly (100) are bended and protruded in the same direction, so as to operate between the active rotary part (101) and the passive rotary part (201), and the operation function is the same as the embodiment shown in FIG. 1.

Figure 8:
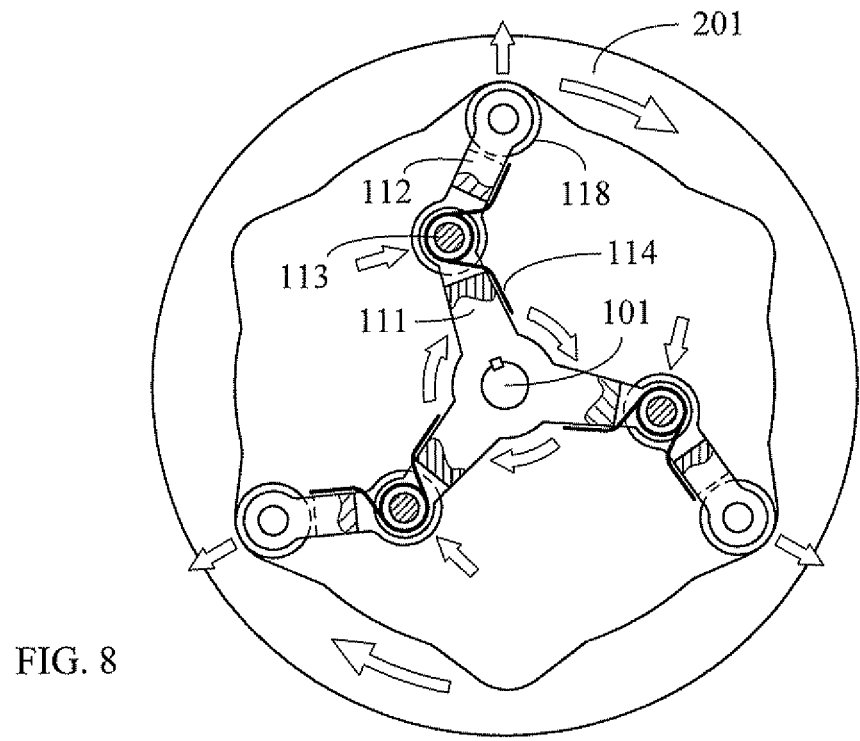
FIG. 8 is a schematic structural view showing a compelling-type radial clutch device with V-shaped joint structure in which three V-shaped joint structure assemblies (100) having the same driving direction relative to the passive rotary part (201) being installed between the active rotary part (101) and the passive rotary part (201), according to one embodiment of the present invention.

FIG. 8 is a schematic structural view showing the compelling-type radial clutch device with V-shaped joint structure in which three V-shaped joint structure assemblies (100) having the same driving direction relative to the passive rotary part (201) being installed between the active rotary part (101) and the passive rotary part (201), according to one embodiment of the present invention.

As shown in FIG. 8, a first V-shaped joint structure assembly (100), a second V-shaped joint structure assembly (100) and a third V-shaped joint structure assembly (100) are installed between the active rotary part (101) and the passive rotary part (201) in a radial arrangement, the joint structures of the first V-shaped joint structure assembly (100), the second V-shaped joint structure assembly (100) and the third V-shaped joint structure assembly (100) are bended and protruded in the same direction, so as to operate between the active rotary part (101) and the passive rotary part (201), the operation function is the same as the embodiment shown in FIG. 1.

Figure 9:
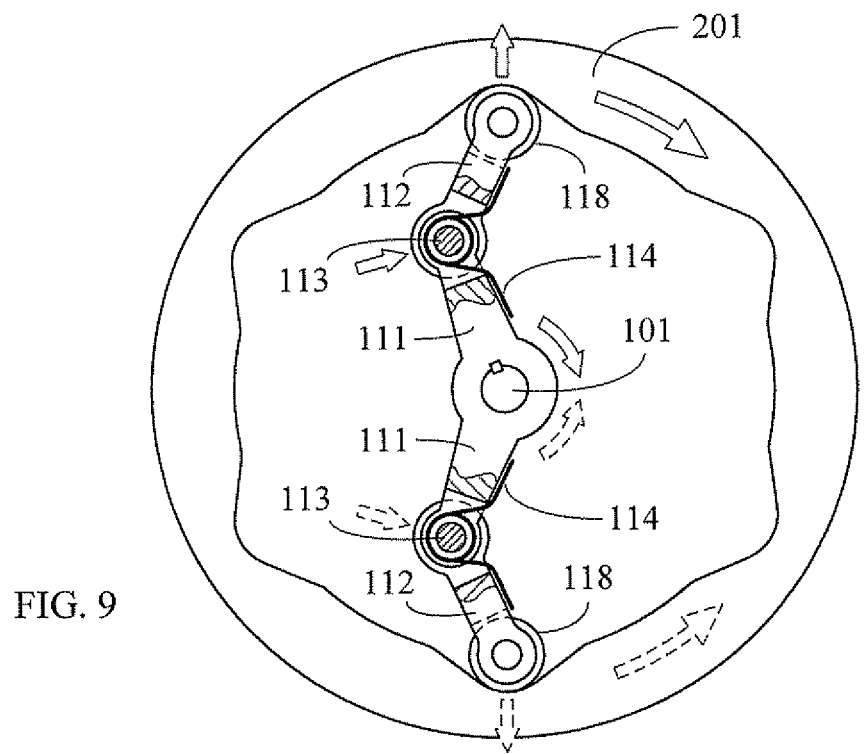
FIG. 9 is a schematic structural view showing the present invention being installed with a V-shaped joint structure assembly (100) clockwise bended and a V-shaped joint structure assembly (100) counterclockwise bended.

FIG. 9 is a schematic structural view showing the present invention being installed with a V-shaped joint structure assembly (100) clockwise bended and a V-shaped joint structure assembly (100) counterclockwise bended.

As shown in FIG. 9, a first V-shaped joint structure assembly (100) and a second V-shaped joint structure assembly (100) are installed between the active rotary part (101) and the passive rotary part (201) in a radial arrangement, and the joint structures of the first V-shaped joint structure assembly (100) and the second V-shaped joint structure assembly (100) are bended and protruded in different directions, so as to operate between the active rotary part (101) and the passive rotary part (201), the operational functions are as followings:
1) the passive rotary part (201) can be driven while the active rotary part (101) performing rotation in both clockwise and counterclockwise directions relative to the passive rotary part (201);
2) when the active rotary part (101) does not input the rotational kinetic energy, the passive rotary part (201) is in an idle rotation state in both clockwise and counterclockwise directions relative to the active rotary part (101).

Figure 10:
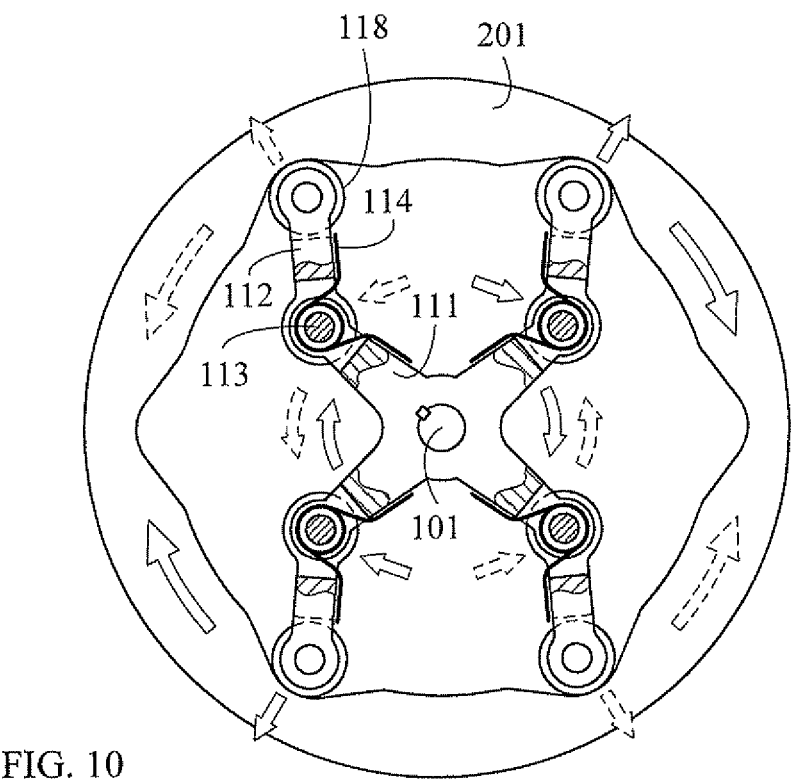
FIG. 10 is a schematic structural view showing the present invention being installed with two V-shaped joint structure assemblies (100) clockwise bended and two V-shaped joint structure assemblies (100) counterclockwise bended.

FIG. 10 is a schematic structural view showing the present invention being installed with two V-shaped joint structure assemblies (100) clockwise bended and two V-shaped joint structure assemblies (100) counterclockwise bended.

As shown in FIG. 10, a first V-shaped joint structure assembly (100), a second V-shaped joint structure assembly (100), a third V-shaped joint structure assembly (100) and a fourth V-shaped joint structure assembly (100) are installed between the active rotary part (101) and the passive rotary part (201) in a circular sequence arranged in a radial arrangement, wherein the joint structures of the first V-shaped joint structure assembly (100) and the third V-shaped joint structure assembly (100) are clockwise bended, and the second V-shaped joint structure assembly (100) and the fourth V-shaped joint structure assembly (100) are counterclockwise bended, and the operational functions between the active rotary part (101) and the passive rotary part (201) are as followings:
1) the passive rotary part (201) can be driven while the active rotary part (101) performing rotation in both clockwise and counterclockwise directions relative to the passive rotary part (201);
2) when the active rotary part (101) does not input the rotational kinetic energy, the passive rotary part (201) is in an idle rotation state in both clockwise and counterclockwise directions relative to the active rotary part (101).

Figure 11:
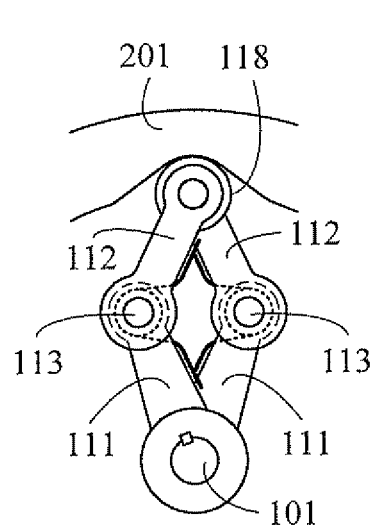
FIG. 11 is a schematic view showing two V-shaped joint structure assemblies (100) having different bending directions and stacked on the same axis, according to the present invention.
Figure 12:
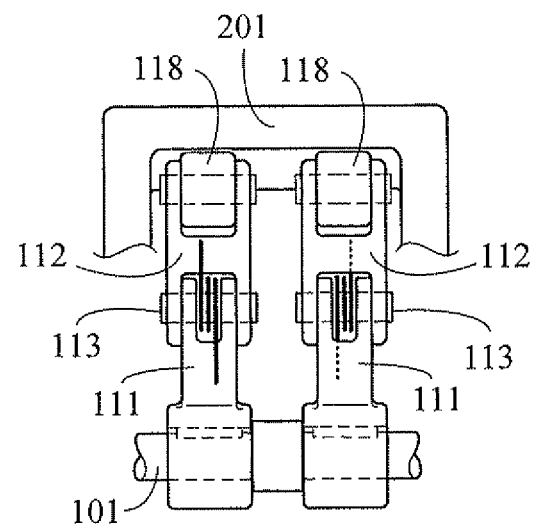
FIG. 12 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the active rotary parts (101) and the passive rotary parts (201) of the two compelling-type radial clutch devices with V-shaped joint structures are coaxially arranged.

According to the present invention of the compelling-type radial clutch device with V-shaped joint structure, when being applied in practical applications, two or more than two of compelling-type radial clutch devices with V-shaped joint structures can be stacked installed on the same axis, and the joint bending directions of the V-shaped joint structure assemblies (100) are opposite (as shown in FIG. 11, which is a schematic view showing two V-shaped joint structure assemblies (100) having different bending directions and stacked on the same axis, according to the present invention); with the structure options of coaxial or separated arrangements of the active rotary part (101) and passive rotary part (201) stacked on the same axis of the individual compelling-type radial clutch device with V-shaped joint structure, the applications are as followings:

FIG. 12 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the active rotary parts (101) and the passive rotary parts (201) of the two compelling-type radial clutch devices with V-shaped joint structures are coaxially arranged.

As shown in FIG. 12, the first compelling-type radial clutch device with V-shaped joint structure having a clockwise bended V-shaped joint structure assembly (100) and the second compelling-type radial clutch device with V-shaped joint structure having a counterclockwise bended V-shaped joint structure assembly (100) are installed, and the active rotary parts (101) and the passive rotary parts (201) of the two compelling-type radial clutch devices with V-shaped joint structures are coaxially arranged, wherein the active rotary part (101) of the first compelling-type radial clutch device with V-shaped joint structure and the active rotary part (101) of the second compelling-type radial clutch device with V-shaped joint structure are coaxially operated; the passive rotary part (201) of the first compelling-type radial clutch device with V-shaped joint structure and the passive rotary part (201) of the second compelling-type radial clutch device with V-shaped joint structure are coaxially operated.

Figure 13:
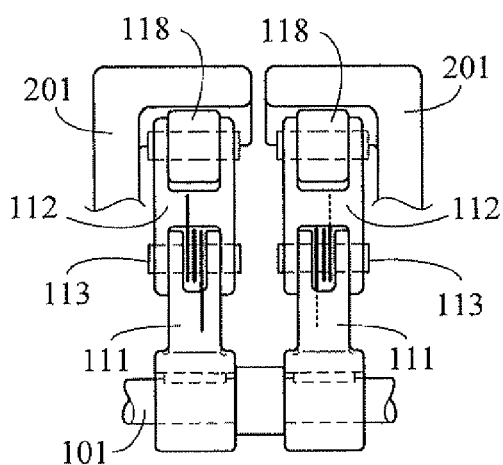
FIG. 13 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the active rotary parts (101) of the two compelling-type radial clutch devices with V-shaped joint structures are coaxially arranged and the passive rotary parts (201) thereof are separately arranged.

FIG. 13 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the active rotary parts (101) of the two compelling-type radial clutch devices with V-shaped joint structures are coaxially arranged and the passive rotary parts (201) thereof are separately arranged.

As shown in FIG. 13, the first compelling-type radial clutch device with V-shaped joint structure having a clockwise bended V-shaped joint structure assembly (100) and the second compelling-type radial clutch device with V-shaped joint structure having a counterclockwise bended V-shaped joint structure assembly (100) are installed, and the active rotary parts (101) of the two compelling-type radial clutch devices with V-shaped joint structures are coaxially arranged and the passive rotary parts (201) thereof are separately arranged, wherein the active rotary part (101) of the first compelling-type radial clutch device with V-shaped joint structure and the active rotary part (101) of the second compelling-type radial clutch device with V-shaped joint structure are coaxially operated; the passive rotary part (201) of the first compelling-type radial clutch device with V-shaped joint structure and the passive rotary part (201) of the second compelling-type radial clutch device with V-shaped joint structure are separately operated.

Figure 14:
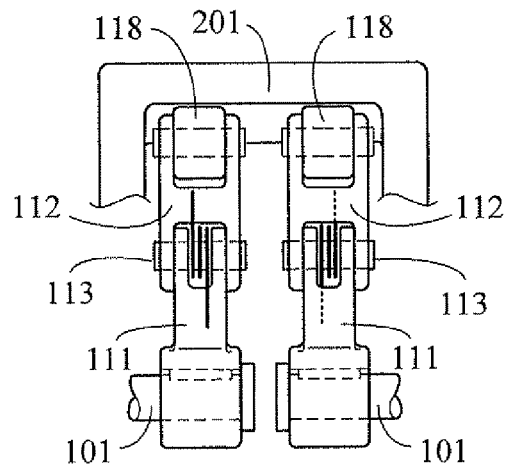
FIG. 14 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the passive rotary parts (201) of the two compelling-type radial clutch devices with V-shaped joint structures are coaxially arranged and the active rotary parts (101) thereof are separately arranged.

FIG. 14 is a schematic structural view showing a first compelling-type radial clutch device with V-shaped joint structure having a clockwise bended V-shaped joint structure assembly (100) and a second compelling-type radial clutch device with V-shaped joint structure having a counterclockwise bended V-shaped joint structure assembly (100), wherein the passive rotary parts (201) of the two compelling-type radial clutch devices with V-shaped joint structures are coaxially arranged and the active rotary parts (101) thereof are separately arranged.

As shown in FIG. 14, the first compelling-type radial clutch device with V-shaped joint structure having a clockwise bended V-shaped joint structure assembly (100) and the second compelling-type radial clutch device with V-shaped joint structure having a counterclockwise bended V-shaped joint structure assembly (100) are installed, and the active rotary parts (101) of the two compelling-type radial clutch devices with V-shaped joint structures are separately arranged and the passive rotary parts (201) thereof are coaxially arranged, wherein the active rotary part (101) of the first compelling-type radial clutch device with V-shaped joint structure and the active rotary part (101) of the second compelling-type radial clutch device with V-shaped joint structure are separately operated; the passive rotary part (201) of the first compelling-type radial clutch device with V-shaped joint structure and the passive rotary part (201) of the second compelling-type radial clutch device with V-shaped joint structure are coaxially operated.

Figure 15:
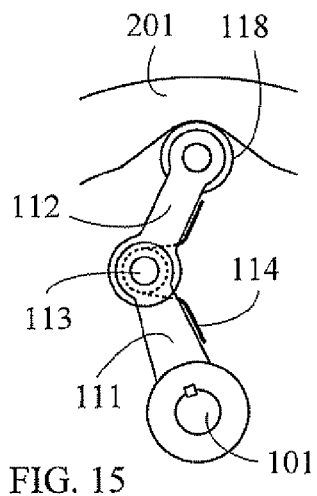
FIG. 15 is a schematic view showing two V-shaped joint structure assemblies (100) having the same bending directions and stacked on the same axis, according to the present invention.
Figure 16:
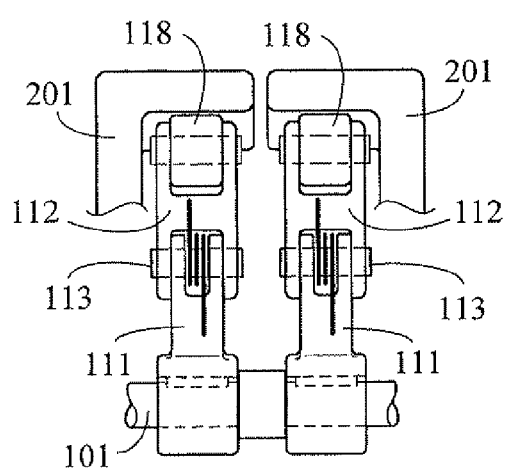
FIG. 16 is a schematic structural view showing two compelling-type radial clutch devices with V-shaped joint structures having V-shaped joint structure assemblies (100) bended in the same direction, wherein the active rotary parts (101) of the two compelling-type radial clutch devices with V-shaped joint structures are coaxially arranged, and the passive rotary parts (201) thereof are separately arranged.

According to the present invention of the compelling-type radial clutch device with V-shaped joint structure, when being applied in practical applications, two or more than two of compelling-type radial clutch devices with V-shaped joint structures can be stacked installed on the same axis, and the joint bending directions of the V-shaped joint structure assemblies (100) are the same (as shown in FIG. 15, which is a schematic view showing two V-shaped joint structure assemblies (100) having the same bending directions and stacked on the same axis, according to the present invention); with the structure options of coaxial or separated arrangements of the active rotary part (101) and passive rotary part (201) stacked on the same axis of the individual compelling-type radial clutch device with V-shaped joint structure, the applications are as followings:

FIG. 16 is a schematic structural view showing two compelling-type radial clutch devices with V-shaped joint structures having V-shaped joint structure assemblies (100) bended in the same direction, wherein the active rotary parts (101) of the two compelling-type radial clutch devices with V-shaped joint structures are coaxially arranged, and the passive rotary parts (201) thereof are separately arranged.

As shown in FIG. 16, the two compelling-type radial clutch devices with V-shaped joint structures having V-shaped joint structure assemblies (100) bended in the same direction are installed, and the active rotary parts (101) of the two compelling-type radial clutch devices with V-shaped joint structures are coaxially arranged, and the passive rotary parts (201) thereof are separately arranged.

Figure 17:
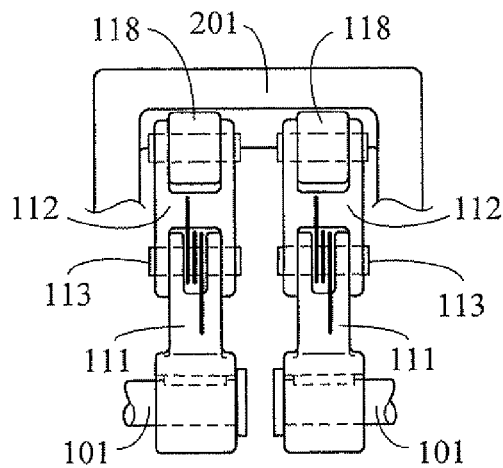
FIG. 17 is a schematic structural view showing two compelling-type radial clutch devices with V-shaped joint structures having V-shaped joint structure assemblies (100) bended in the same direction, wherein the passive rotary parts (201) of the two compelling-type radial clutch devices with V-shaped joint structures are coaxially arranged, and the active rotary parts (101) thereof are separately arranged.

FIG. 17 is a schematic structural view showing two compelling-type radial clutch devices with V-shaped joint structures having V-shaped joint structure assemblies (100) bended in the same direction, wherein the passive rotary parts (201) of the two compelling-type radial clutch devices with V-shaped joint structures are coaxially arranged, and the active rotary parts (101) thereof are separately arranged.

As shown in FIG. 17, the two compelling-type radial clutch devices with V-shaped joint structures having V-shaped joint structure assemblies (100) bended in the same direction are installed, and the passive rotary parts (201) of the two compelling-type radial clutch devices with V-shaped joint structures are coaxially arranged, and the active rotary parts (101) thereof are separately arranged.

Figure 18:
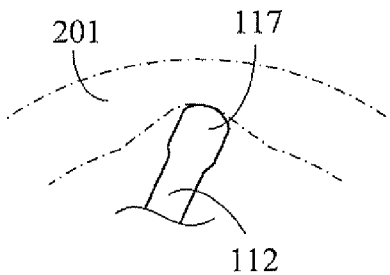
FIG. 18 is a schematic view showing the compelling roller (118) of the compelling arm of V-shaped joint structure (112) being replaced by a compelling head (117).

FIG. 18 is a schematic view showing the compelling roller (118) of the compelling arm of V-shaped joint structure (112) being replaced by a compelling head (117).

Figure 19:
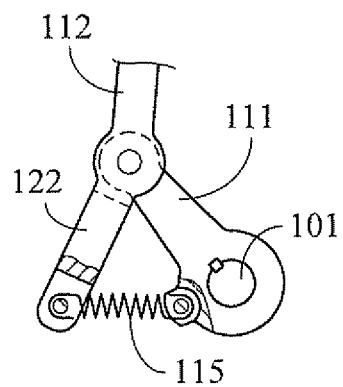
FIG. 19 is a schematic view showing another structure of the outward-expanding recovery spring according to the present invention.

As shown in FIG. 18, the compelling roller (118) for coupling the compelling arm of V-shaped joint structure (112) and the passive rotary part (201) of the V-shaped joint structure assembly (100) installed between the active rotary part (101) and the passive rotary part (201) is replaced by the compelling head (117);

FIG. 19 is a schematic view showing another structure of the outward-expanding recovery spring according to the present invention.

Figure 20:
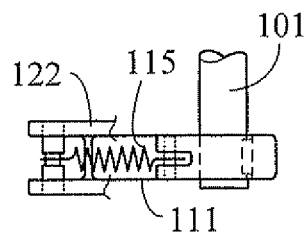
FIG. 20 is a bottom view of FIG. 19.

FIG. 20 is a bottom view of FIG. 19.

As shown in FIG. 19 and FIG. 20, the outward-expanding recovery spring (114) served to form a prestressed outward expanding force between the active arm of V-shaped joint structure (111) and the compelling arm of V-shaped joint structure (112) in the V-shaped joint structure assembly (100) is replace by a structure in which the compelling arm of V-shaped joint structure (112) is installed with an extended rod of compelling arm of V-shaped joint structure (122), and a tension spring (115) is installed between the extended rod of compelling arm of V-shaped joint structure (122) and the active arm of V-shaped joint structure (111), so as to form an outward expanding force between the active arm of V-shaped joint structure (111) and the compelling arm of V-shaped joint structure (112).

Figure 21:
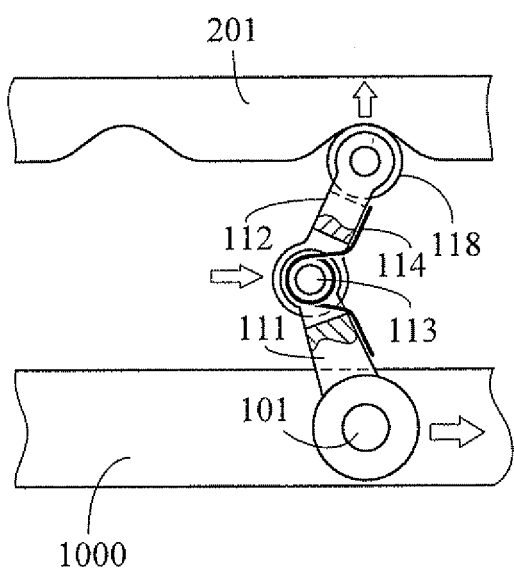
FIG. 21 is a schematic view showing the fundamental theory structure in which the active rotary part and the passive rotary part being respectively composed of a linear structure, according to the present invention.

As commonly known, in a radial clutch device having a larger diameter, the annular structure of its passive rotary part (201) is close to a linear state of a straight line, thereby the compelling-type radial clutch device with V-shaped joint structure provided by the present invention can be further applied in a linear clutch device, the illustrations are as followings:

FIG. 21 is a schematic view showing the fundamental theory structure in which the active rotary part and the passive rotary part being respectively composed of a linear structure, according to the present invention.

As shown in FIG. 21, a linear linkage interactive state is formed between the active rotary part (101) and the passive rotary part (201), the active rotary part (101) is in a linear driving state, and the passive rotary part (201) is operated with a linear means, and a V-shaped joint structure assembly (100) is installed between the active rotary part (101) and the passive rotary part (201), the main structure and operation are as followings:

Active rotary part (101): installed in an active side machine body (1000) and serving to input the active linear kinetic energy, one end of the active arm of V-shaped joint structure (111) is connected and fastened on the active rotary part (101), the other end of the active arm of V-shaped joint structure (111) is coupled with a compelling arm of V-shaped joint structure (112) through a bendable V-shaped joint structure (100) installed therebetween, and installed with a joint axial core of V-shaped joint structure (113), an outward-expanding recovery spring (114) is installed between the active arm of V-shaped joint structure (111) and the compelling arm of V-shaped joint structure (112), so that a prestressed outward-expanding force is formed between the active arm of V-shaped joint structure (111) and the compelling arm of V-shaped joint structure (112) for performing the angle displacement by causing the angle between the arms to increase;

Passive rotary part (201): which is a rotation structure for outputting the linear kinetic energy, and installed with a transmission part formed in a linear structure, in which an inner notch (204) is inwardly provided, for being coupled with a compelling roller (118);

Compelling arm of V-shaped joint structure (112) having the compelling roller (118) at the distal end, and a compelling engagement state is formed between the compelling roller (118) and a compelling end surface of passive side notch (202) of the passive rotary part (201);

The operational function of the active rotary part (101) and the passive rotary part (201) in the mentioned linear structure is the same as that of the radial clutch operation.

The invention claimed is:

1. A radial clutch device, comprising:
    an active rotary part (101);
    an annular passive rotary part (201) having at least one inner notch (202);
    a joint structure installed between the active rotary part (101) and the passive rotary part (201), and driven by the active rotary part (101), wherein the joint structure includes:
        an active arm (111) having a first end connected to the active rotary part (101) such that the active arm (111) rotates with the active rotary part (101);
        a compression arm (112);
        a joint axial core (113) pivotally connecting a second end of the active arm (111) and a first end of the compression arm (112);
        an outwardly expanding spring (114) installed between the active arm (111) and the compression arm (112), wherein the outwardly expanding spring (114) biases the compression arm (112) to bend in a direction that increases an angle between the active arm (111) and the compression arm (112) and causes a second end of the compression arm (112) to be displaced outwardly to engage the passive rotary part (201);
        one of a compression roller (118) and a compression head (117) installed on the second end of the compression arm (112), wherein:
    when the active rotary part (101) is driven by a rotational kinetic energy source in a first direction opposite to the direction in which the compression arm (112) is biased to bend, the compression roller (118) or compression head (117) is pressed outwardly and forced into the notch (202) so that the active rotary part transmits torque through the joint structure to drive the passive rotary part (201), and
    when the active rotary (101) is not driven by the rotational kinetic energy source and the passive rotary part (201) is driven in the first or second direction, the rotary compression roller (118) or compression head (117) moves out of the notch (202) along an extended inclined inner surface (203) of the passive rotary part (201), causing the joint structure to retract and the angle between the active arm (111) and passive arm (112) to decrease so that an idle sliding rotation state is formed between the passive rotary part (201) and the active rotary part (101).

2. A radial clutch device as claimed in claim 1, wherein said one of said compression roller (118) and said compression head (117) is the compression head (117).

3. A radial clutch device as claimed in claim 1, wherein when the active rotary part (101) is driven by the rotational kinetic energy source in a second direction opposite the first direction, the rotary compression roller also moves out of the notch (202) along the extended inclined inner surface (203) of the passive rotary part (201), causing the joint structure to retract and the angle between the active arm (111) and passive arm (112) to decrease so that the idle sliding rotation state is again formed between the passive rotary part (201) and the active rotary part (101).

4. A radial clutch device as claimed in claim 3, wherein the passive rotary part (201) includes at least a second said notch (202), and further comprising a second said joint structure installed between the active rotary part (101) and passive rotary part (201).

5. A radial clutch device as claimed in claim 4, wherein the passive rotary part (201) includes at least a third said notch (202), and further comprising a third said joint structure installed between the active rotary part (101) and the passive rotary part (201).

6. A radial clutch device as claimed in claim 4, wherein the second said joint structure is biased in a same rotary direction as the first said joint structure.

7. A radial clutch device as claimed in claim 4, where the second said joint structure is biased in an opposite rotary direction as the first said joint structure.

8. A radial clutch device as claimed in claim 4, wherein the passive rotary part (201) includes at least a third said notch (202) and a fourth said notch (202), and further comprising a third said joint structure and a fourth said joint structure installed between the active rotary part (101) and the passive rotary part.

9. A radial clutch device as claimed in claim 8, wherein the second said joint structure is biased in a same direction as the first said joint structure, and wherein the third and fourth said joint structures are biased in an opposite direction as the first said joint structure.

10. A radial clutch device as claimed in claim 1, 3, 4, 5, 6, 7, 8, or 9, wherein said one of said compression roller (118) and said compression head (117) is the compression roller (118).

* * * * *